United States Patent
Lin et al.

(10) Patent No.: US 8,169,157 B2
(45) Date of Patent: May 1, 2012

(54) PASSIVE CURRENT BALANCE DRIVING APPARATUS

(75) Inventors: Che-Min Lin, Taoyuan County (TW); Yi-Chun Yeh, Taoyuan County (TW)

(73) Assignee: FSP Technology Inc., Taoyuan, Taoyuan County (TW)

( * ) Notice: Subject to any disclaimer, the term of this patent is extended or adjusted under 35 U.S.C. 154(b) by 461 days.

(21) Appl. No.: 12/545,079

(22) Filed: Aug. 21, 2009

(65) Prior Publication Data

US 2011/0018463 A1 Jan. 27, 2011

(30) Foreign Application Priority Data

Jul. 27, 2009 (TW) ................................ 98125239 A

(51) Int. Cl.
*H05B 37/02* (2006.01)
(52) U.S. Cl. ......... 315/294; 315/250; 315/297; 315/307
(58) Field of Classification Search .................. 315/246, 315/250, 291, 294, 297, 307
See application file for complete search history.

(56) References Cited

U.S. PATENT DOCUMENTS

| 6,621,235 | B2 | 9/2003 | Chang |
| 6,853,150 | B2 * | 2/2005 | Clauberg et al. .......... 315/185 R |
| 6,864,867 | B2 | 3/2005 | Biebl |
| 2005/0218838 | A1 * | 10/2005 | Lys .............................. 315/291 |

* cited by examiner

*Primary Examiner* — Jason M Crawford
(74) *Attorney, Agent, or Firm* — Winston Hsu; Scott Margo

(57) ABSTRACT

A passive current balance driving apparatus including first and second drivers is provided. The first driver includes a first balance-capacitor having a first terminal coupled to a first terminal of an AC signal source and a second terminal providing a first balance AC-voltage; and a first rectification unit rectifying the first balance AC-voltage to output a first DC-voltage to drive a first LED string with multi-LEDs connected in series. The second driver includes a second balance-capacitor having a first terminal coupled to a first terminal of the AC signal source and a second terminal providing a second balance AC-voltage; and a second rectification unit rectifying the second balance AC-voltage to output a second DC-voltage to drive a second LED string with multi-LEDs connected in series. The capacitive reactances of these two balance-capacitors are the same and respectively greater than the total internal resistances of the first and second LED strings.

16 Claims, 3 Drawing Sheets

PASSIVE CURRENT BALANCE DRIVING APPARATUS

CROSS-REFERENCE TO RELATED APPLICATION

This application claims the priority benefit of Taiwan application serial no. 98125239, filed on Jul. 27, 2009. The entirety of the above-mentioned patent application is hereby incorporated by reference herein and made a part of specification.

BACKGROUND OF THE INVENTION

1. Field of the Invention

The present invention relates to a current balance technology, more particularly, to a passive current balance driving apparatus.

2. Description of the Related Art

Recently, with booming development of the semiconductor technology, portable electronic products and flat panel displays are widely used. Among various kinds of flat panel displays, the liquid crystal displays (LCDs) having the features of low operation voltage, no radiation, light-weight, small-size, etc. become a mainstream of display products. In general, since the LCD panel does not have a self-illuminating property. Therefore, the backlight module should be disposed under the LCD panel so as to provide a backlight source to the LCD panel.

A conventional backlight module can be roughly classified into two types, i.e. a cold cathode fluorescent lamp (CCFL) backlight module and a light emitting diode (LED) backlight module. Since the LED backlight module is capable of improving color gamut of the LCD, panel manufacturers prefer to employ the LED backlight module in replacement of the CCFL backlight module.

The LED backlight module has a plurality of LED strings connected in parallel, and each of the LED strings is composed by a plurality of LEDs connected in series. In practical, a DC-DC converter is mostly used to convert a DC power supply to a DC voltage so as to simultaneously drive each of the LED strings. However, since the characteristics of each of the LEDs are not exactly the same, for example, the internal resistance of the LED. Therefore, the total equivalent internal resistances of each of the LED strings are different. Accordingly, it can be inferred that the currents respectively following through each of the LED strings are not the same, namely, current unbalance. Thus, the brightness of the backlight source provided by the LED backlight module for LCD panel is non-uniform.

For solving such problem, a current balance control circuit can be added into the LED backlight module to regulate the currents respectively following through each of the LED strings, so as to make that the currents respectively following through each of the LED strings are the same, namely, current balance. A popular current balance control circuit may be composed by a current mirror circuit or a current feedback compensation circuit both constituted by a plurality of active elements such as MOSFETs. In addition, the current balance control circuit also can be composed by a ready-made current regulation chip such as a current sink IC.

However, the semiconductor devices such as the MOSFETs are always affected by process variation, and thus causing that the characteristic curves (Id/Vgs) for the drain current (Id) and the gate-source voltage (Vgs) of each of the MOSFETs are different. Therefore, the accuracy for using the current mirror circuit or the current feedback compensation circuit both constituted by MOSFETs to regulate the currents respectively following through each of the LED strings is limited.

In addition, the number of regulation driving channels of the ready-made current regulation chip is generally fixed, and the number of regulation driving channels is commonly 4 or 6. Since one regulation driving channel is only used for regulating the current following through one LED string, so that when the LED backlight module has 10 LED strings, three current regulation chips each having 4 regulation driving channels, or two current regulation chips each having 6 regulation driving channels should be elected and used, but whatever one is elected and used, two regulation driving channels are wasted. Therefore, there would be unnecessary costs.

SUMMARY OF THE INVENTION

Accordingly, the present invention is directed to a passive current balance driving apparatus including a first and a second drivers. The first driver includes a first balance capacitor and a first rectification unit. A first terminal of the first balance capacitor is coupled to a first terminal of an AC signal source and a second terminal of the first balance capacitor is used for providing a first balance AC-voltage. The first rectification unit is coupled to the second terminal of the first balance capacitor, and is used for receiving and rectifying the first balance AC-voltage so as to output a first DC-voltage to drive a plurality of first LEDs connected in series.

In addition, the second driver includes a second balance capacitor and a second rectification unit. A first terminal of the second balance capacitor is coupled to the first terminal of the AC signal source and a second terminal of the second balance capacitor is used for providing a second balance AC-voltage. The second rectification unit is coupled to the second terminal of the second balance capacitor, and used for receiving and rectifying the second balance AC-voltage so as to output a second DC-voltage to drive a plurality of second light-emitting-diodes (LEDs) connected in series.

In an embodiment of the present embodiment, a capacitive reactance of the first balance capacitor is greater than a total equivalent internal resistance of all of the first LEDs; a capacitive reactance of the second balance capacitor is greater than a total equivalent internal resistance of all of the second LEDs; and the capacitive reactances of the first and the second balance capacitors are equal.

From the above, the present invention designs the capacitive reactance of the balance capacitor being greater than the total equivalent internal resistance of LEDs connected in series, accordingly, the current following through the LEDs connected in series is determined by the capacitive reactance of the balance capacitor and the voltage value of the AC signal source. Therefore, if the capacitive reactances of the balance capacitors of all of the drivers in the passive current balance driving apparatus are designed to equal, the currents respectively following through each of the LED strings are approximately and thus achieving the purpose of current balance.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
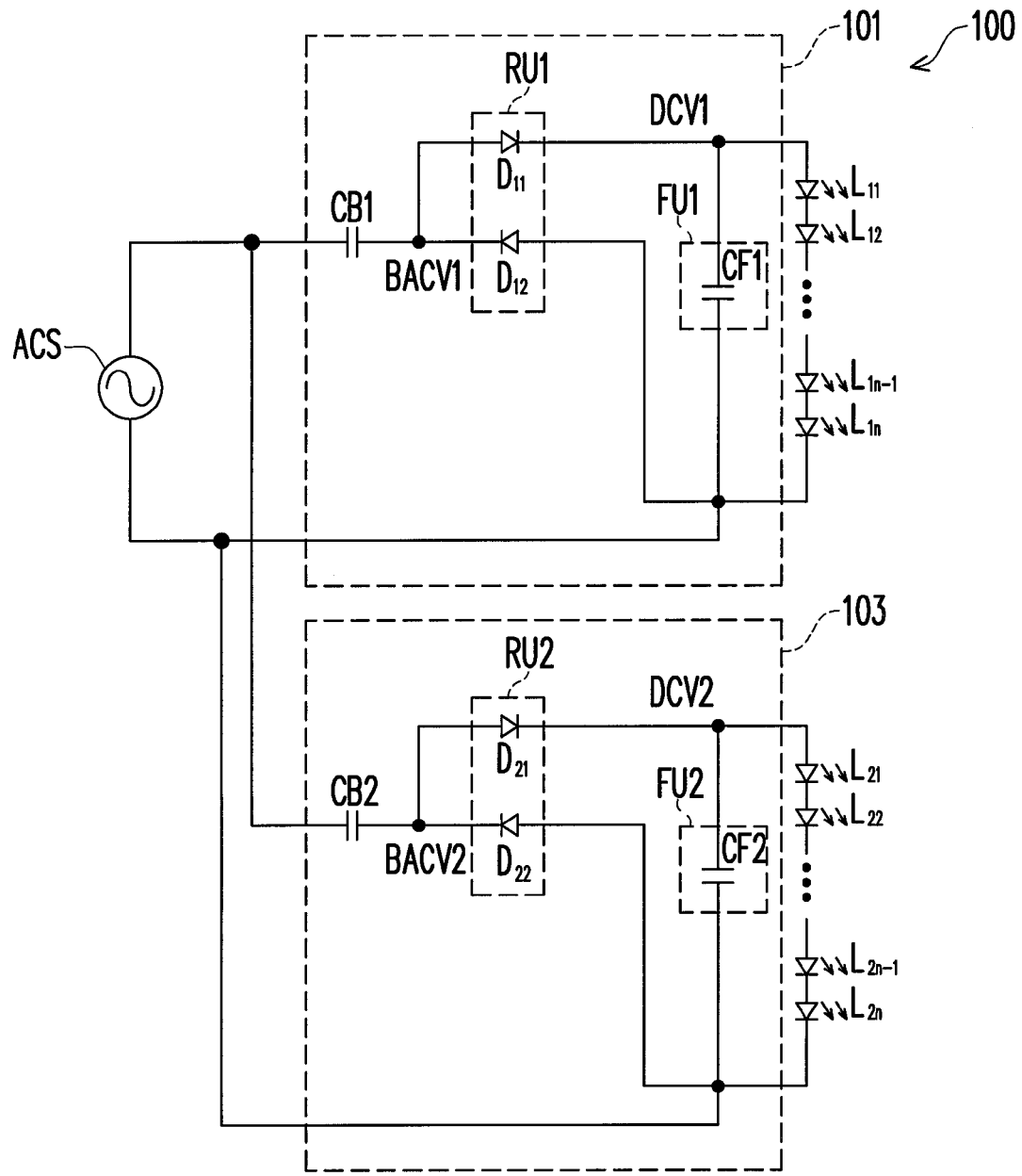
FIG. 1 is a circuit diagram of a passive current balance driving apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a circuit diagram of a passive current balance driving apparatus 100 according to an embodiment of the present invention. Referring to FIG. 1, the passive current balance driving apparatus 100 includes drivers 101 and 103. The driver 101 includes a balance capacitor CB1, a rectification unit RU1 and a filter unit FU1; and the driver 103 includes a balance capacitor CB2, a rectification unit RU2 and a filter unit FU2.

In this embodiment, a first terminal of the balance capacitor CB1 is coupled to a first terminal of an AC signal source ACS and a second terminal of the balance capacitor CB1 is used for providing a balance AC-voltage BACV1. The AC signal source ACS is formed by, for example, a secondary side of an isolation transformer in a DC-DC converter, but not limited thereto. In addition, the rectification unit RU1 is coupled to the second terminal of the balance capacitor CB1, and is used for receiving and rectifying the balance AC-voltage BACV1 so as to output a DC-voltage DCV1 to drive a plurality of first LEDs $L_{11}$~$L_{1n}$ connected in series. Furthermore, the filter unit FU1 is coupled to the rectification unit RU1, and is used for filtering the DC-voltage DCV1 outputted by the rectification unit RU1. In other embodiments of the present invention, the filter unit FU1 may be omitted under the rectifying effect of the rectification unit RU1 is good.

From the above, it can be known that the driver 101 and the LEDs $L_{11}$~$L_{1n}$ connected in series forms a complete current loop, such that the driver 101 receives the AC-voltage provided by the AC signal source ACS to obtain the balance AC-voltage BACV1 through the balance capacitor CB1.

Herein, the rectification unit RU1 includes diodes $D_{11}$ and $D_{12}$. An anode of the diode $D_{11}$ is coupled to the second terminal of the balance capacitor CB1 and a cathode of the diode $D_{11}$ is coupled to an anode of a $1^{st}$ LED $L_{11}$ in the LEDs $L_{11}$~$L_{1n}$. An anode of the diode $D_{12}$ is coupled to a cathode of a last LED $L_{1n}$ in the LEDs $L_{11}$~$L_{1n}$ and a cathode of the diode $D_{12}$ is coupled to the anode of the diode $D_{11}$. In addition, the filter unit FU1 includes a filter capacitor CF1. A first terminal of the filter capacitor CF1 is coupled to the cathode of the diode $D_{11}$ and a second terminal of the filter capacitor CF1 is coupled to the anode of the diode $D_{12}$ and a second terminal of the AC signal source ACS.

In the other hands, a first terminal of the balance capacitor CB2 is coupled to the first terminal of the AC signal source ACS and a second terminal of the balance capacitor CB2 is used for providing a balance AC-voltage BACV2. In addition, the rectification unit RU2 is coupled to the second terminal of the balance capacitor CB2, and used for receiving and rectifying the balance AC-voltage BACV2 so as to output a DC-voltage DCV2 to drive a plurality of LEDs $L_{21}$~$L_{2n}$ connected in series. Furthermore, the filter unit FU2 is coupled to the rectification unit RU2, and is used for filtering the DC-voltage DCV2 outputted by the rectification unit RU2. In other embodiments of the present invention, the filter unit FU2 may be omitted under the rectifying effect of the rectification unit RU2 is good.

Herein, the rectification unit RU2 includes diodes $D_{21}$ and $D_{22}$. An anode of the diode $D_{21}$ is coupled to the second terminal of the balance capacitor CB2 and a cathode of the diode $D_{21}$ is coupled to an anode of a $1^{st}$ LED $L_{21}$ in the LEDs $L_{21}$~$L_{2n}$. An anode of the diode $D_{22}$ is coupled to a cathode of a last LED $L_{2n}$ in the LEDs $L_{21}$~$L_{2n}$ and a cathode of the diode $D_{22}$ is coupled to the anode of the diode $D_{21}$. In addition, the filter unit FU2 includes a filter capacitor CF2. A first terminal of the filter capacitor CF2 is coupled to the cathode of the diode $D_{21}$ and a second terminal of the filter capacitor CF2 is coupled to the anode of the diode $D_{22}$ and the second terminal of the AC signal source ACS.

From the above, it can be known that the driver 103 and the LEDs $L_{21}$~$L_{2n}$ connected in series forms a complete current loop, such that the driver 103 receives the AC-voltage provided by the AC signal source ACS to obtain the balance AC-voltage BACV2 through the balance capacitor CB2.

In this embodiment, since the characteristics of each of the LEDs $L_{11}$~$L_{1n}$ and $L_{21}$~$L_{2n}$ are not exactly the same, for example, the internal resistances of each LEDs $L_{11}$~$L_{1n}$ and $L_{21}$~$L_{2n}$ are not exactly the same. Therefore, the total equivalent internal resistances of this two LED strings $L_{11}$~$L_{1n}$ and $L_{21}$~$L_{2n}$ are different.

Accordingly, if using the same DC-voltage to drive this two LED strings $L_{11}$~$L_{1n}$ and $L_{21}$~$L_{2n}$, since the total equivalent internal resistances of this two LED strings $L_{11}$~$L_{1n}$ and $L_{21}$~$L_{2n}$ are different, therefore, the currents respectively following through this two LED strings $L_{11}$~$L_{1n}$ and $L_{21}$~$L_{2n}$ are different, namely, current unbalance, and thus the brightness of this two LED strings $L_{11}$~$L_{1n}$ and $L_{21}$~$L_{2n}$ are different.

For solving such problem, the capacitive reactances ($1/\omega C$) of the balance capacitors CB1 and CB2 are designed to equal by this embodiment. The capacitive reactance of the balance capacitor CB1 is greater than the total equivalent internal resistance of all of the LEDs $L_{11}$~$L_{1n}$; and the capacitive reactance of the balance capacitor CB2 is greater than the total equivalent internal resistance of all of the LEDs $L_{21}$~$L_{2n}$. Accordingly, let the current following through the LEDs $L_{11}$~$L_{1n}$ is determined by the voltage difference between the first and the second terminals of the AC signal source ACS and the capacitive reactance of the balance capacitor CB1 rather than the total equivalent internal resistance of all of the LEDs $L_{11}$~$L_{1n}$. Moreover, let the current following through the LEDs $L_{21}$~$L_{2n}$ is determined by the voltage difference between the first and the second terminals of the AC signal source ACS and the capacitive reactance of the balance capacitor CB2 rather than the total equivalent internal resistance of all of the LEDs $L_{21}$~$L_{2n}$. As a result, the currents respectively following through this two LED strings $L_{11}$~$L_{1n}$ and $L_{21}$~$L_{2n}$ are approximately (i.e. current balance) and thus making that the brightness of this two LED strings $L_{11}$~$L_{1n}$ and $L_{21}$~$L_{2n}$ are the same.

It should be noted that the second terminal of the AC signal source ACS as shown in FIG. 1 also may be coupled to the anodes of the $1^{st}$ LEDs $L_{11}$ and $L_{21}$ respectively in the LEDs $L_{11}$~$L_{1n}$ and $L_{21}$~$L_{2n}$, so as to achieve the similarly technical efficiency.

Figure 2:
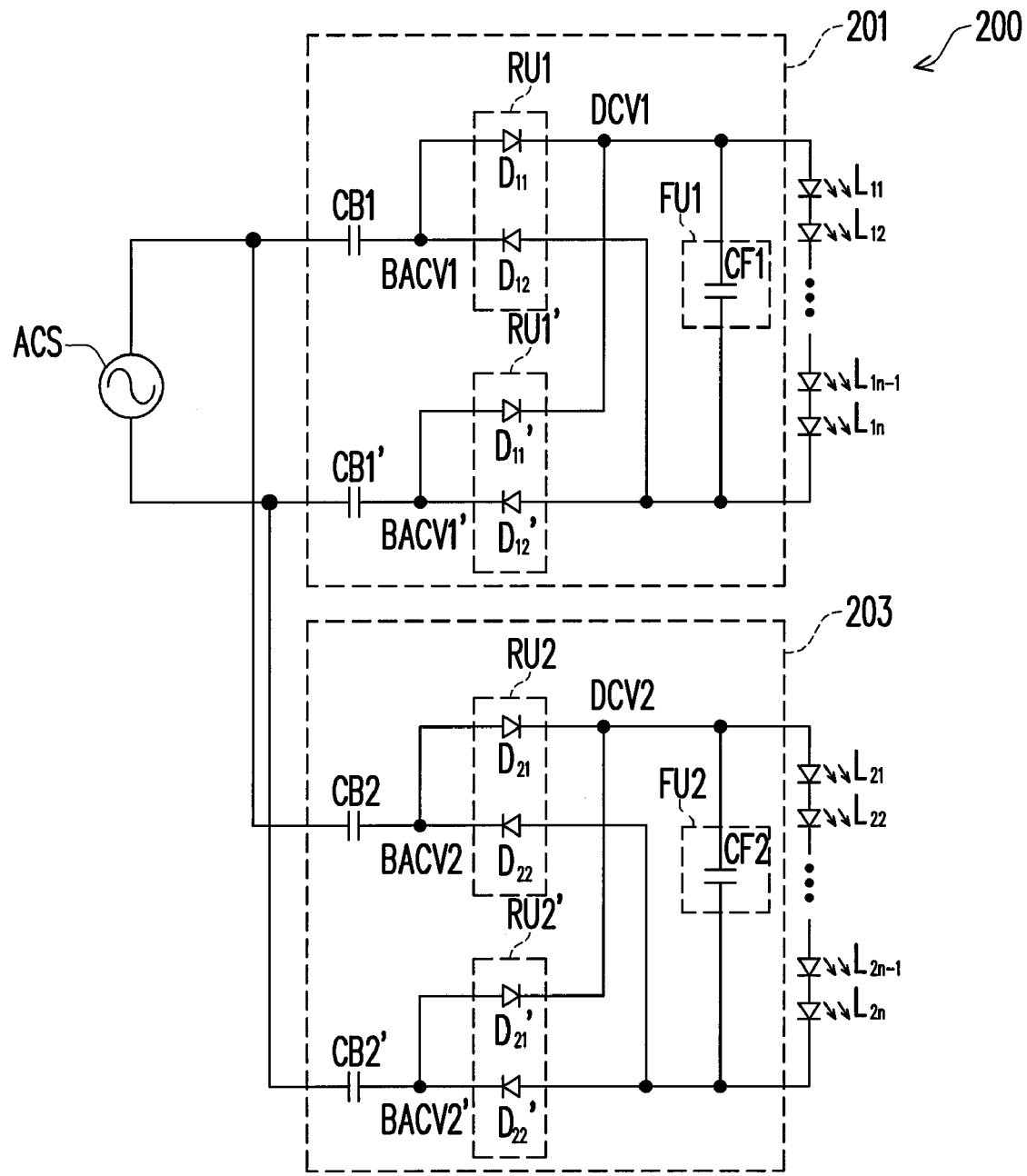
FIG. 2 is a circuit diagram of a passive current balance driving apparatus according to another embodiment of the present invention.

Besides, FIG. 2 is a circuit diagram of a passive current balance driving apparatus 200 according to another embodiment of the present invention. Referring to FIGS. 1 and 2, the passive current balance driving apparatus 200 includes drivers 201 and 203. The different between the passive current balance driving apparatuses 100 and 200 is that the driver 201 further includes a balance capacitor CB1' and a rectification unit RU1' than the driver 101; and the driver 203 further includes a balance capacitor CB2' and a rectification unit RU2' than the driver 103. Moreover, the second terminal of the filter capacitor CF1 is unnecessarily coupled to the second terminal of the AC signal source ACS.

In this embodiment as shown in FIG. 2, the capacitive reactance of the balance capacitor CB1' is also greater than the total equivalent internal resistance of all of the LEDs $L_{11} \sim L_{1n}$, but the capacitive reactances of the balance capacitors CB1 and CB1' are equal. Similarly, the capacitive reactance of the balance capacitor CB2' is also greater than the total equivalent internal resistance of all of the LEDs $L_{21} \sim L_{2n}$, but the capacitive reactances of the balance capacitors CB2 and CB2' are equal. To be specific, the capacitive reactances of the balance capacitors CB1, CB1', CB2 and CB2' are equal.

In this embodiment as shown in FIG. 2, the first terminals of the balance capacitors CB1 and CB2 are also coupled to the first terminal of the AC signal source ACS, and the second terminals of the balance capacitors CB1 and CB2 are respectively used for providing the balance AC-voltages BACV1 and BACV2. In addition, the first terminals of the balance capacitors CB1' and CB2' are coupled to the second terminal of the AC signal source ACS, and the second terminals of the balance capacitors CB1' and CB2' are respectively used for providing the balance AC-voltages BACV1' and BACV2'.

Herein, the rectification unit RU1' is coupled to the second terminal of the balance capacitor CB1', and used for receiving and rectifying the balance AC-voltage BACV1' so as to output the DC-voltage DCV1 to drive the LEDs $L_{11} \sim L_{1n}$. The rectification unit RU1' includes diodes $D_{11}'$ and $D_{12}'$. An anode of the diode $D_{11}'$ is coupled to the second terminal of the balance capacitor CB1' and a cathode of the diode $D_{11}'$ is coupled to the cathode of the diode $D_{11}$. An anode of the diode $D_{12}'$ is coupled to the anode of the diode $D_{12}$ and a cathode of the diode $D_{12}'$ is coupled to the anode of the diode $D_{11}'$.

Similarly, the rectification unit RU2' is coupled to the second terminal of the balance capacitor CB2', and used for receiving and rectifying the balance AC-voltage BACV2' so as to output the DC-voltage DCV2 to drive the LEDs $L_{21} \sim L_{2n}$. The rectification unit RU2' includes diodes $D_{21}'$ and $D_{22}'$. An anode of the diode $D_{21}'$ is coupled to the second terminal of the balance capacitor CB2' and a cathode of the diode $D_{21}'$ is coupled to the cathode of the diode $D_{21}$. An anode of the diode $D_{22}'$ is coupled to the anode of the diode $D_{22}$ and a cathode of the diode $D_{22}'$ is coupled to the anode of the diode $D_{21}'$.

From the above, the capacitive reactances of the balance capacitors CB1, CB1', CB2 and CB2' are designed to equal by this embodiment. The capacitive reactances of the balance capacitors CB1 and CB1' are greater than the total equivalent internal resistance of all of the LEDs $L_{11} \sim L_{1n}$; and the capacitive reactances of the balance capacitors CB2 and CB2' are greater than the total equivalent internal resistance of all of the LEDs $L_{21} \sim L_{2n}$. Accordingly, let the current following through the LEDs $L_{11} \sim L_{1n}$ is determined by the voltage difference between the first and the second terminals of the AC signal source ACS and the capacitive reactances of the balance capacitors CB1 and CB1' rather than the total equivalent internal resistance of all of the LEDs $L_{11} \sim L_{1n}$. Moreover, let the current following through the LEDs $L_{21} \sim L_{2n}$ is determined by the voltage difference between the first and the second terminals of the AC signal source ACS and the capacitive reactances of the balance capacitors CB2 and CB2' rather than the total equivalent internal resistance of all of the LEDs $L_{21} \sim L_{2n}$. As a result, the currents respectively following through this two LED strings $L_{11} \sim L_{1n}$ and $L_{21} \sim L_{2n}$ are approximately (i.e. current balance) and thus making that the brightness of this two LED strings $L_{11} \sim L_{1n}$ and $L_{21} \sim L_{2n}$ are the same.

Figure 3:
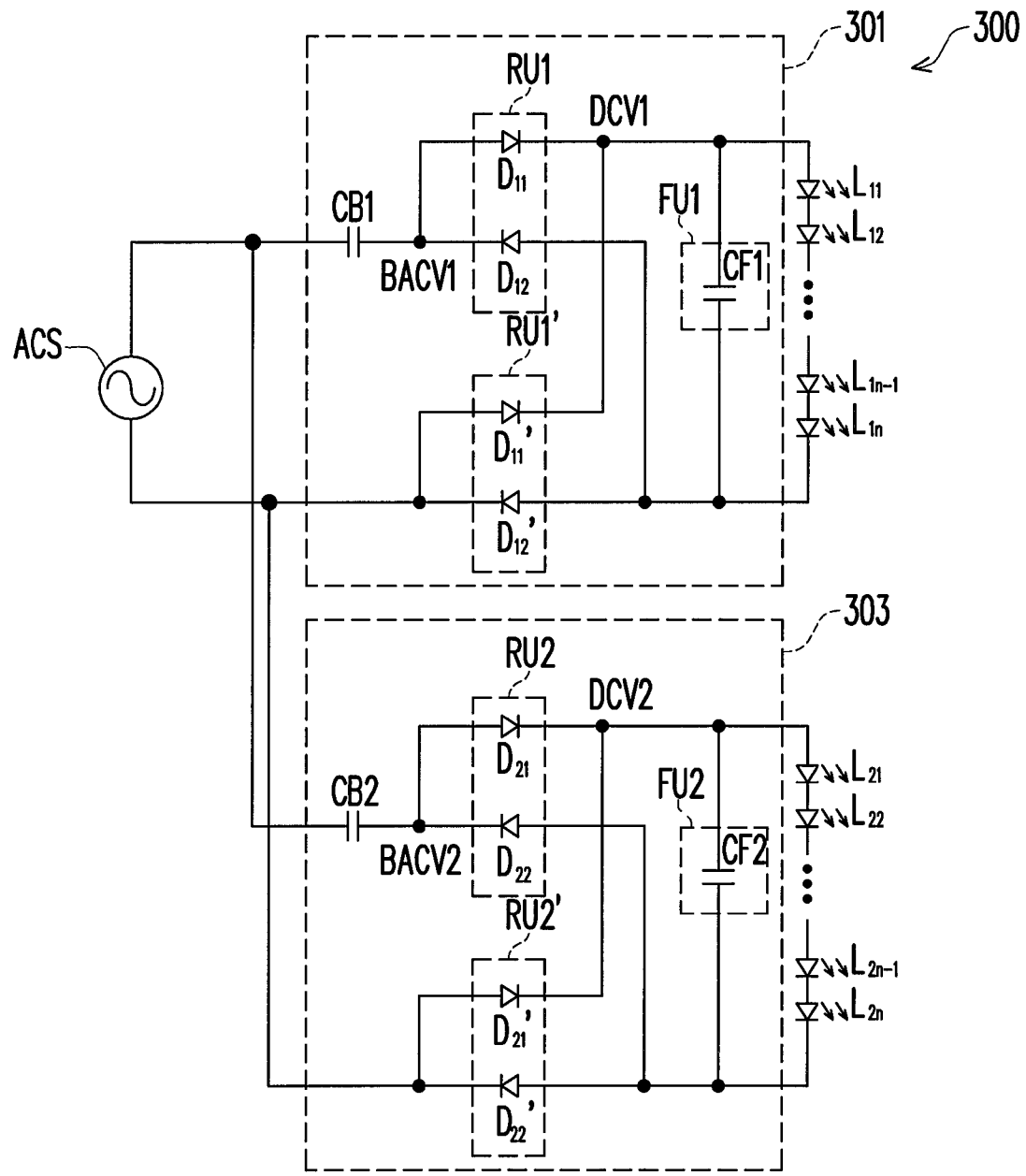
FIG. 3 is a circuit diagram of a passive current balance driving apparatus according to further embodiment of the present invention.

Furthermore, FIG. 3 is a circuit diagram of a passive current balance driving apparatus 300 according to further embodiment of the present invention. Referring to FIGS. 2 and 3, the passive current balance driving apparatus 300 includes drivers 301 and 303. The different between the passive current balance driving apparatuses 200 and 300 is that the driver 301 does not have the balance capacitor CB1' than the driver 201; and the driver 303 does not have the balance capacitor CB2' than the driver 203. However, since the operations of the passive current balance driving apparatuses 200 and 300 are similarly, so the detail descriptions for the passive current balance driving apparatus 300 are omitted accordingly.

In application, if each of the drivers in the passive current balance driving apparatuses 100, 200, 300 is modular designed and accordingly increasing the amount of the modular designed drivers, the passive current balance driving apparatuses 100, 200, 300 can be used to drive each of the LED strings in the LED backlight module of the LCD, so as to make that the currents respectively following through each of the LED strings are the same, namely, current balance. Thus, the brightness of the backlight source provided by the LED backlight module for LCD panel is further uniform.

However, the passive current balance driving apparatuses 100, 200, 300 are not limited to drive each of the LED strings in the LED backlight module of the LCD nothing more. In other words, the passive current balance driving apparatuses 100, 200, 300 can be applied to achieve the purpose of current balance under the plurality of LED strings are driven at the same time, for example, a large-sized LED billboard.

In addition, since each of the drivers in the passive current balance driving apparatuses 100, 200 and 300 is only composed by a few passive elements. Therefore, the fabrication costs would substantially lower than the traditional current balance control circuit composed by a plurality of active elements (i.e. MOSFETs) or the current regulation chip (i.e. current sink IC).

In summary, the present invention designs the capacitive reactance of the balance capacitor being greater than the total equivalent internal resistance of LEDs connected in series, accordingly, the current following through the LEDs connected in series is determined by the capacitive reactance of the balance capacitor and the voltage value of the AC signal source. Therefore, if the capacitive reactances of the balance capacitors of all of the drivers in the passive current balance driving apparatus are designed to equal, the currents respectively following through each of the LED strings are approximately and thus achieving the purpose of current balance.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A passive current balance driving apparatus, comprising:
   a first driver, comprising:
      a first balance capacitor having a first terminal coupled to a first terminal of an AC signal source and a second terminal providing a first balance AC-voltage; and
      a first rectification unit, coupled to the second terminal of the first balance capacitor, for receiving and rectifying the first balance AC-voltage so as to output a first DC-voltage to drive a plurality of first light-emitting-diodes (LEDs) connected in series; and
   a second driver, comprising:
      a second balance capacitor having a first terminal coupled to the first terminal of the AC signal source and a second terminal providing a second balance AC-voltage; and
      a second rectification unit, coupled to the second terminal of the second balance capacitor, for receiving and rectifying the second balance AC-voltage so as to output a second DC-voltage to drive a plurality of second LEDs connected in series,
   wherein a capacitive reactance of the first balance capacitor is greater than a total equivalent internal resistance of all of the first LEDs; a capacitive reactance of the second balance capacitor is greater than a total equivalent internal resistance of all of the second LEDs; and the capacitive reactances of the first and the second balance capacitors are equal.

2. The passive current balance driving apparatus according to claim 1, wherein the first rectification unit comprises:
   a first diode having an anode coupled to the second terminal of the first balance capacitor and a cathode coupled to an anode of a $1^{st}$ first LED in the first LEDs; and
   a second diode having an anode coupled to a cathode of a last first LED in the first LEDs and a cathode coupled to the anode of the first diode.

3. The passive current balance driving apparatus according to claim 2, wherein the first driver further comprises:
   a filter unit, coupled to the first rectification unit, for filtering the first DC-voltage outputted by the first rectification unit.

4. The passive current balance driving apparatus according to claim 3, wherein the filter unit comprises:
   a filter capacitor having a first terminal coupled to the cathode of the first diode and a second terminal coupled to the anode of the second diode.

5. The passive current balance driving apparatus according to claim 4, wherein the first terminal or the second terminal of the filter capacitor is further coupled to a second terminal of the AC signal source.

6. The passive current balance driving apparatus according to claim 4, wherein the first driver further comprises:
   a third balance capacitor having a first terminal coupled to a second terminal of the AC signal source and a second terminal providing a third balance AC-voltage; and
   a third rectification unit, coupled to the second terminal of the third balance capacitor, for receiving and rectifying the third balance AC-voltage so as to output the first DC-voltage to drive the first LEDs,
   wherein a capacitive reactance of the third balance capacitor is greater than the total equivalent internal resistance of all of the first LEDs, and the capacitive reactances of the first and the third balance capacitors are equal.

7. The passive current balance driving apparatus according to claim 6, wherein the third rectification unit comprises:
   a third diode having an anode coupled to the second terminal of the third balance capacitor and a cathode coupled to the cathode of the first diode; and
   a fourth diode having an anode coupled to the anode of the second diode and a cathode coupled to the anode of the third diode.

8. The passive current balance driving apparatus according to claim 4, wherein the first driver further comprises:
   a third rectification unit, comprising:
      a third diode having an anode coupled to the second terminal of the AC signal source and a cathode coupled to the cathode of the first diode; and
      a fourth diode having an anode coupled to the anode of the second diode and a cathode coupled to the anode of the third diode.

9. The passive current balance driving apparatus according to claim 1, wherein the second rectification unit comprises:
   a first diode having an anode coupled to the second terminal of the second balance capacitor and a cathode coupled to an anode of a $1^{st}$ second LED in the second LEDs; and
   a second diode having an anode coupled to a cathode of a last second LED in the second LEDs and a cathode coupled to the anode of the first diode.

10. The passive current balance driving apparatus according to claim 9, wherein the second driver further comprises:
    a filter unit, coupled to the second rectification unit, for filtering the second DC-voltage outputted by the second rectification unit.

11. The passive current balance driving apparatus according to claim 10, wherein the filter unit comprises:
    a filter capacitor having a first terminal coupled to the cathode of the first diode and a second terminal coupled to the anode of the second diode.

12. The passive current balance driving apparatus according to claim 11, wherein the first terminal or the second terminal of the filter capacitor is further coupled to a second terminal of the AC signal source.

13. The passive current balance driving apparatus according to claim 11, wherein the second driver further comprises:
    a third balance capacitor having a first terminal coupled to a second terminal of the AC signal source and a second terminal providing a third balance AC-voltage; and
    a third rectification unit, coupled to the second terminal of the third balance capacitor, for receiving and rectifying the third balance AC-voltage so as to output the second DC-voltage to drive the second LEDs,
    wherein a capacitive reactance of the third balance capacitor is greater than the total equivalent internal resistance of all of the second LEDs, and the capacitive reactances of the second and the third balance capacitors are equal.

14. The passive current balance driving apparatus according to claim 13, wherein the third rectification unit comprises:
    a third diode having an anode coupled to the second terminal of the third balance capacitor and a cathode coupled to the cathode of the first diode; and
    a fourth diode having an anode coupled to the anode of the second diode and a cathode coupled to the anode of the third diode.

15. The passive current balance driving apparatus according to claim 11, wherein the second driver further comprises:

a third rectification unit, comprising:
- a third diode having an anode coupled to the second terminal of the AC signal source and a cathode coupled to the cathode of the first diode; and
- a fourth diode having an anode coupled to the anode of the second diode and a cathode coupled to the anode of the third diode.

16. The passive current balance driving apparatus according to claim 11, wherein the passive current balance driving apparatus is at least suitable for driving an LED backlight module of a liquid crystal display.

* * * * *